United States Patent
Sato et al.

(10) Patent No.: US 11,722,775 B2
(45) Date of Patent: Aug. 8, 2023

(54) IMAGE PICKUP APPARATUS AND CONTROLLING METHOD THEREOF

(71) Applicant: CANON KABUSHIKI KAISHA, Tokyo (JP)

(72) Inventors: Natsuko Sato, Kanagawa (JP); Shunsuke Chino, Saitama (JP); Ryo Kawasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/880,066

(22) Filed: Aug. 3, 2022

(65) Prior Publication Data
US 2023/0055269 A1  Feb. 23, 2023

(51) Int. Cl.
*H04N 23/695* (2023.01)
*H04N 23/611* (2023.01)
*H04N 23/67* (2023.01)

(52) U.S. Cl.
CPC ......... *H04N 23/695* (2023.01); *H04N 23/611* (2023.01); *H04N 23/675* (2023.01)

(58) Field of Classification Search
CPC .... H04N 23/611; H04N 23/675; H04N 23/67; H04N 23/695; H04N 23/58; H04N 23/673; H04N 23/672; H04N 23/55; H04N 23/687; H04N 23/54; G03B 5/06; G03B 5/08; G03B 13/34; G03B 2205/0038
USPC ......................................................... 348/345
See application file for complete search history.

(56) References Cited

U.S. PATENT DOCUMENTS

| | | | | |
|---|---|---|---|---|
| 6,359,650 B1* | 3/2002 | Murakami | ........... | G06V 30/142 |
| | | | | 348/346 |
| 7,183,530 B2* | 2/2007 | Abe | ...................... | G02B 27/64 |
| | | | | 348/E5.024 |
| 7,605,860 B2* | 10/2009 | Saitoh | ..................... | G03B 5/06 |
| | | | | 348/345 |

(Continued)

FOREIGN PATENT DOCUMENTS

| | | | |
|---|---|---|---|
| JP | 2020-076960 A | 5/2020 | |
| JP | 2020-106630 A | 7/2020 | |

(Continued)

OTHER PUBLICATIONS

The above foreign patent documents were cited in the May 9, 2023 Japanese Office Action, a copy of which is enclosed with an English Translation, that issued in Japanese Patent Application No. 2022-069042.

*Primary Examiner* — Pritham D Prabhakher
(74) *Attorney, Agent, or Firm* — Cowan, Liebowitz & Latman, P.C.

(57) ABSTRACT

An image pickup apparatus includes an image sensor configured to capture an optical image formed by an image pickup optical system, and a controlling unit configured to, in tilt imaging that changes a tilt angle, set a focal plane to any position such that an angle between the focal plane and the optical axis is changed, by controlling at least one of a position of a focus lens in the image pickup optical system and the tilt angle. The controlling unit controls the at least one so as not to set the focal plane to a first position corresponding to a position of a first target object that is an imaging target, but to set the focal plane to a second position that is different from the first position and at which the position of the first target object is included in a depth of field.

19 Claims, 12 Drawing Sheets

(56) References Cited

U.S. PATENT DOCUMENTS

| | | | |
|---|---|---|---|
| 11,399,126 B2* | 7/2022 | Numata | H04N 23/673 |
| 11,582,394 B2* | 2/2023 | Sato | H04N 23/54 |
| 2002/0080242 A1* | 6/2002 | Takahashi | H04N 23/68 |
| | | | 348/347 |
| 2007/0071429 A1* | 3/2007 | Woehler | G03B 5/08 |
| | | | 396/89 |
| 2016/0277668 A1* | 9/2016 | Yokozeki | H04N 23/672 |
| 2017/0272658 A1* | 9/2017 | Ito | H04N 23/55 |
| 2018/0332236 A1* | 11/2018 | Glaser | H04N 23/69 |
| 2019/0349530 A1* | 11/2019 | Niga | H04N 23/662 |
| 2019/0349532 A1* | 11/2019 | Niga | H04N 23/67 |
| 2020/0137293 A1* | 4/2020 | Numata | H04N 23/67 |
| 2020/0137313 A1* | 4/2020 | Sato | H04N 23/695 |
| 2020/0177817 A1* | 6/2020 | Osawa | H04N 23/69 |
| 2020/0177820 A1* | 6/2020 | Kobayashi | H04N 5/2621 |
| 2020/0191563 A1* | 6/2020 | Sato | H04N 23/695 |
| 2020/0213523 A1* | 7/2020 | Niga | H04N 23/675 |
| 2020/0236290 A1* | 7/2020 | Kawasaki | G03B 13/32 |
| 2020/0296296 A1* | 9/2020 | Chino | G02B 27/0068 |
| 2020/0304721 A1* | 9/2020 | Sugaya | H04N 23/67 |
| 2021/0185198 A1* | 6/2021 | Attar | H04N 23/55 |

FOREIGN PATENT DOCUMENTS

| | | | |
|---|---|---|---|
| JP | 2020-144158 A | | 9/2020 |
| JP | 2020-194125 A | | 12/2020 |
| JP | 2021-005860 A | | 1/2021 |
| JP | 2021-033189 A | | 3/2021 |
| JP | 2021-113909 A | | 8/2021 |

* cited by examiner

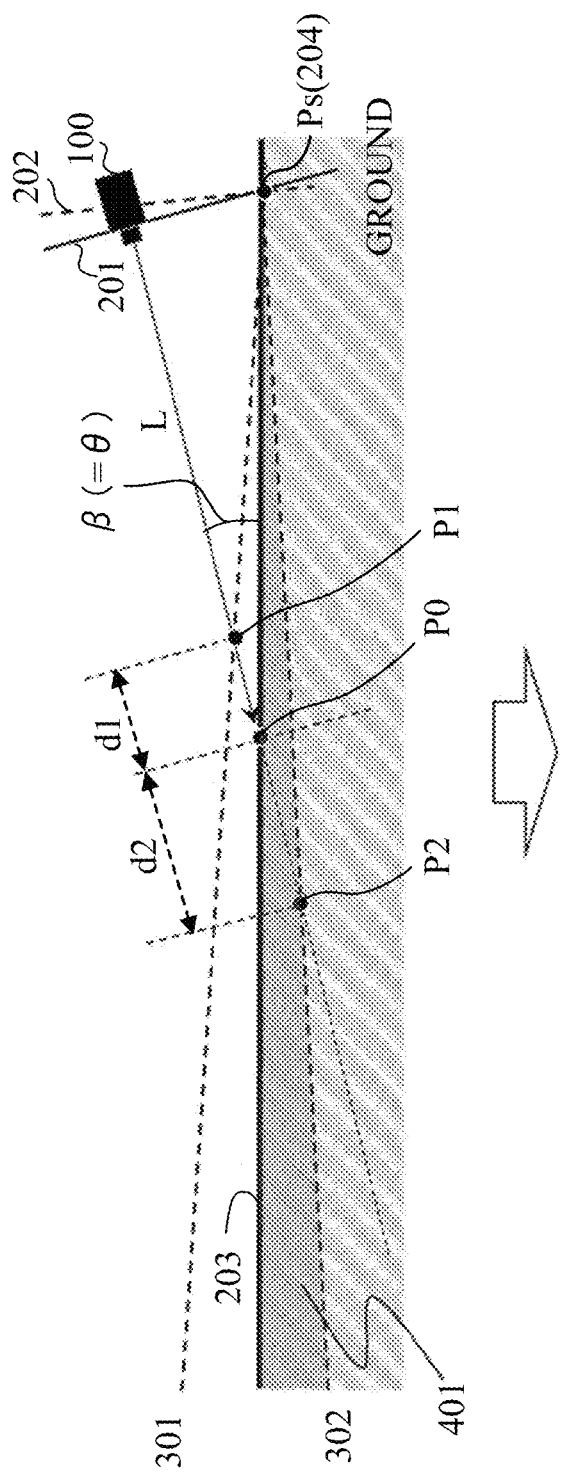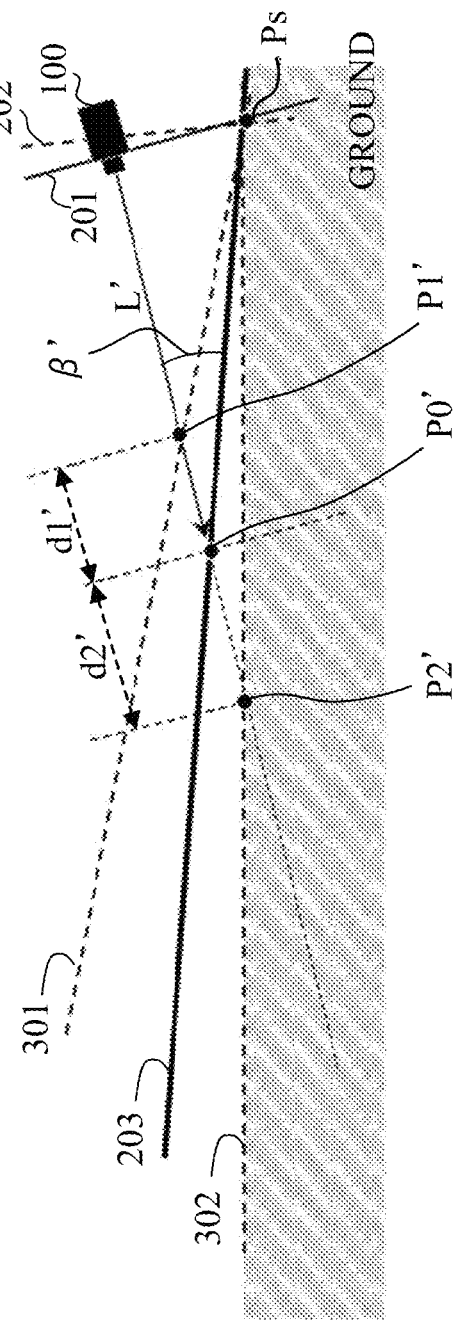
FIG. 4A
FIG. 4B

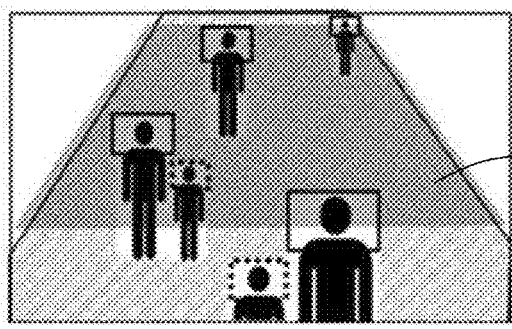
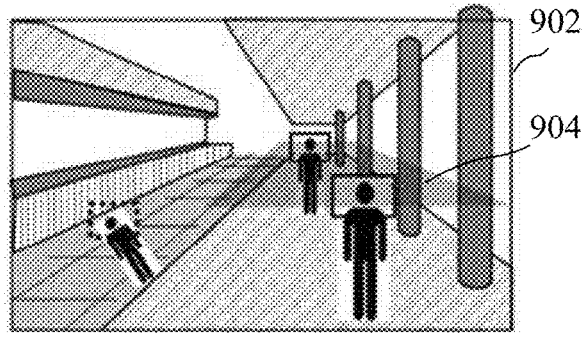
FIG. 9A  FIG. 9B
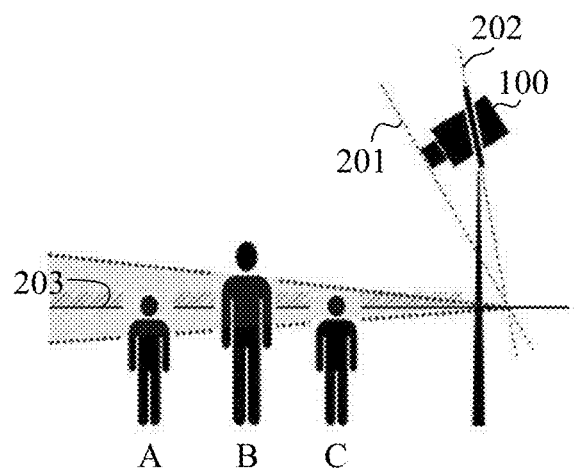
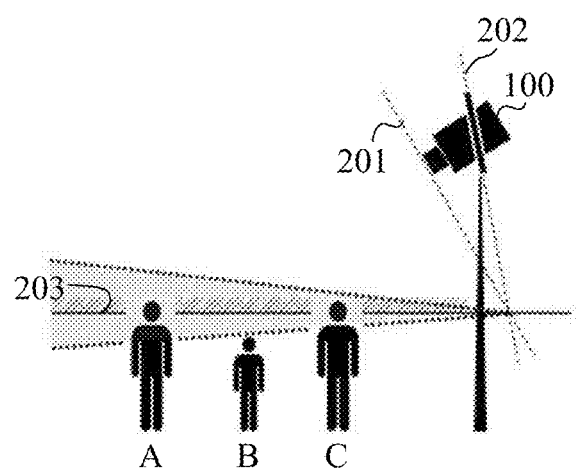
⇒FOCUS SEARCH TO
NEAR SIDE
⇒FOCUS SEARCH TO
FAR SIDE
FIG. 10A  FIG. 10B

IN-FOCUS EVALUATION VALUE: HIGH　　IN-FOCUS EVALUATION VALUE: LOW

IMAGE PICKUP APPARATUS AND CONTROLLING METHOD THEREOF

BACKGROUND OF THE INVENTION

Field of the Invention

The present disclosure relates to an image pickup apparatus that can perform tilt imaging.

Description of the Related Art

For a purpose of tilting a plane that is focused on (focal plane), or the like, tilt imaging can be performed by tilting an image pickup plane relatively to a plane orthogonal to an optical axis of an image pickup optical system. Tilt imaging realizes an increase in a depth of field without narrowing an aperture of a diaphragm, and realizes imaging while focusing on an object in a wide range in a horizontal depth direction even in a scene with a small light amount.

Japanese Patent Laid-Open No. ("JP") 2020-76960 discloses an image pickup apparatus that detects a horizontal plane in a captured image generated by imaging and provides tilt control so as to focus on the detected horizontal plane. JP 2021-33189 discloses an image pickup apparatus that acquires respective in-focus degrees in two areas of a captured image and provides, based on a difference between the in-focus degrees, control on tilting operation and focusing operation so as to focus on those two areas located at different positions in a depth direction.

However, in each of the image pickup apparatuses disclosed in JP 2020-76960 and JP 2021-33189, blur caused by a difference in a height from a focal plane (often referred to as upper/lower blur), which is unique to tilt imaging, is not taken into account. Specifically, in a case where tilt control for focusing on a detected horizontal plane is performed as in the image pickup apparatus disclosed in JP 2020-76960, an object at a height different from a height of the horizontal plane may be blurred. Also, in a case where the image pickup apparatus disclosed in JP 2021-33189 is used, if objects are located in three or more areas in a captured image, and a height of an object in an area is different from heights of objects in two areas used for the control on the tilting operation and the focusing operation, the object at the different height may be blurred.

SUMMARY OF THE INVENTION

The present disclosure provides an image pickup apparatus that can perform tilt imaging that reduces blur occurring in an object at a position (height, etc.) different from a position of a focal plane, and a controlling method thereof.

An image pickup apparatus according to one aspect of the present disclosure includes an image sensor configured to capture an optical image formed by an image pickup optical system, at least one processor, and at least one memory coupled to the at least one processor storing instructions that, when executed by the at least one processor, cause the at least one processor to function as a controlling unit. The controlling unit is configured to, in tilt imaging that changes a tilt angle between an image pickup plane of the image sensor and a plane orthogonal to an optical axis of the image pickup optical system, set a focal plane to any position such that an angle between the focal plane and the optical axis is changed, by controlling at least one of (i) a position of a focus lens included in the image pickup optical system and (ii) the tilt angle. The controlling unit controls the at least one so as not to set the focal plane to a first position corresponding to a position of a first target object that is an imaging target, but to set the focal plane to a second position that is different from the first position and at which the position of the first target object is included in a depth of field.

A controlling method corresponding to the image pickup apparatus and a storage medium storing the controlling method also constitute other aspects of the present disclosure.

Further features of the present invention will become apparent from the following description of exemplary embodiments with reference to the attached drawings.

BRIEF DESCRIPTION OF THE DRAWINGS

FIGS. 4A and 4B are diagrams illustrating a calculation when a lower depth end is set to a height of the ground.

FIGS. 9A and 9B are diagrams illustrating a scene to be imaged according to the second embodiment.

FIGS. 10A and 10B are diagrams illustrating focus search according to the second embodiment.

DESCRIPTION OF THE EMBODIMENTS

Referring now to the accompanying drawings, a description will be given of embodiments according to the present invention.

Figure 1:
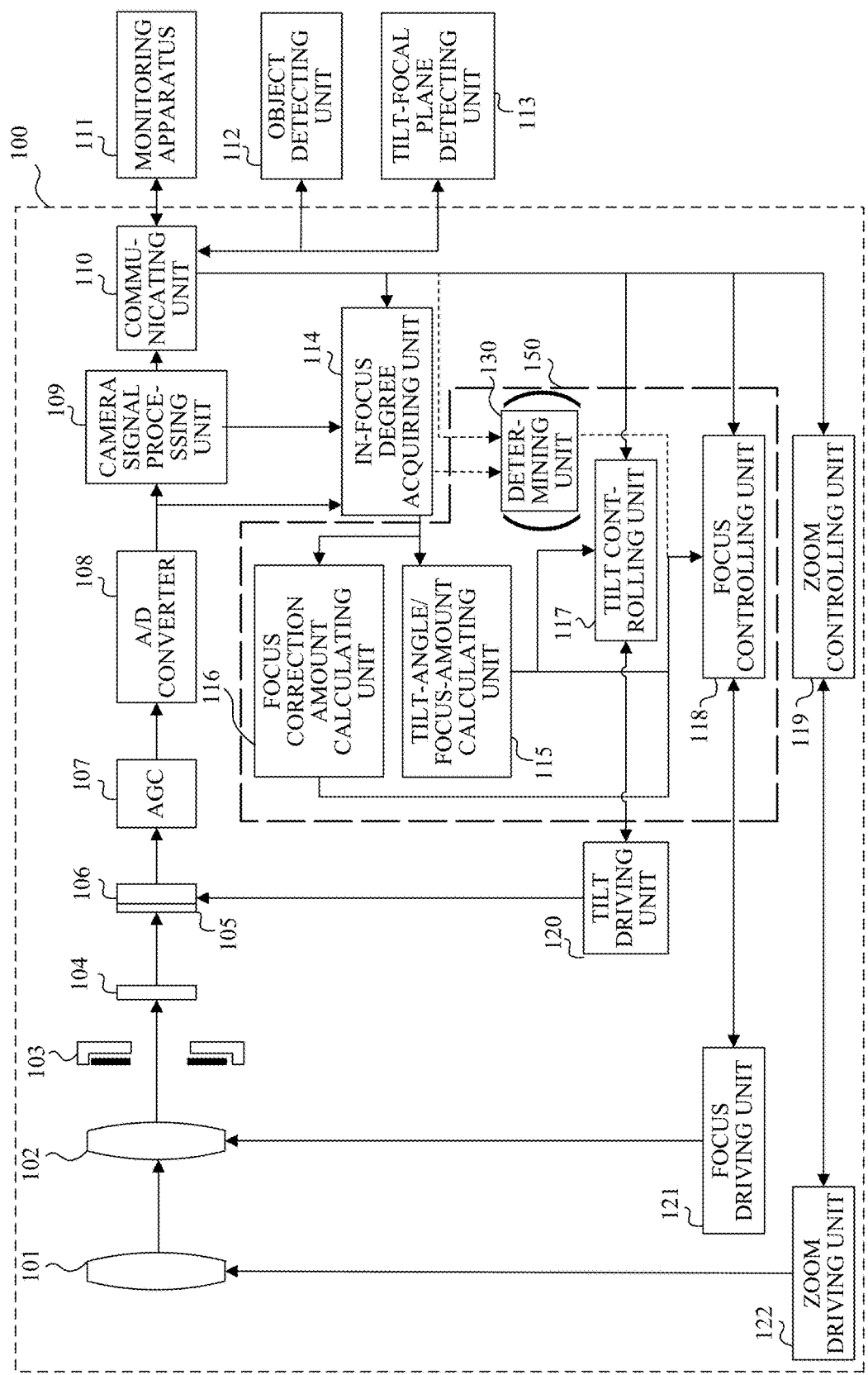
FIG. 1 is a block diagram illustrating a configuration of an image pickup apparatus according to first and second embodiments.

FIG. 1 illustrates a configuration of an image pickup apparatus 100, which is an embodiment of the present disclosure. An image pickup optical system includes a zoom lens 101 that changes a focal length by moving in an optical axis direction, a focus lens 102 that adjusts focus by moving in the optical axis direction, and a diaphragm unit 103 that adjusts a light amount. The image pickup optical system may be integrally configured with the image pickup apparatus 100, or may be detachably attachable to the image pickup apparatus 100. Light that has passed through the image pickup optical system, a band path filter (BPF) 104, and a color filter 105 forms an object image as an optical image on an image sensor 106. The BPF 104 may be capable of retracting from and advancing into an optical path of the image pickup optical system. The object image is photo-electrically converted by the image sensor 106.

In this embodiment, tilt imaging can be performed in which a focal plane is tilted relatively to a principal plane orthogonal to an optical axis of the image pickup optical system (hereinafter, referred to as a lens principal plane) by tilting an image pickup plane of the image sensor 106 relatively to the lens principal plane. In the following description, a focal plane having been tilted relatively to the lens principal plane is referred to as a "tilted focal plane". In this embodiment, it is possible to set a position in a vertical direction (height direction) of the tilted focal plane to any position such that an angle between the tilted focal plane and the optical axis is changed. In the following description, the position in the height direction of the tilted focal plane is referred to as a height of the tilted focal plane.

An analog image pickup signal (output signal) output from the image sensor 106 is gain-adjusted by an AGC 107, converted into a digital image pickup signal by an A/D converter 108, and then input to a camera signal processing unit (image generating unit) 109. The camera signal processing unit 109 generates a video signal (captured image) by performing various image processing on the digital image pickup signal.

The video signal is output to a monitoring apparatus 111 connected to the image pickup apparatus 100 by wired or wireless communication via a communicating unit 110. The monitoring apparatus 111 displays and records the captured image input from the image pickup apparatus 100. According to an instruction by a user, the monitoring apparatus 111 outputs a control signal such as a command to a tilt controlling unit 117, a focus controlling unit 118, and a zoom controlling unit 119 in the image pickup apparatus 100 via the communicating unit 110.

The object detecting unit 112 performs image processing for detecting a target object, which is an imaging target, from the input captured image. Target object information including position information on the target object detected by the object detecting unit 112 is transmitted to an in-focus degree acquiring unit 114 via the communicating unit 110. The in-focus degree acquiring unit 114 calculates (acquires) an in-focus evaluation value described later based on the target object information. Although FIG. 1 illustrates a case where the object detecting unit 112 is provided outside the image pickup apparatus 100, the object detecting unit 112 may be provided inside the image pickup apparatus 100.

The tilt-focal plane detecting unit 113 detects an area to which the tilted focal plane can be set (an area in which a close side to a far side can be focused on) in the captured image. Specifically, the captured image is divided into a plurality of areas, and an object distance is acquired for each area while the focus lens 102 is driven. Thereafter, the tilt-focal plane detecting unit 113 compares the object distances in order from an area in which the object distance is short to an area in which the object distance is long, and detects, as an area to which the tilted focal plane can be set, a plurality of areas (for example, horizontal area) such that a difference between the object distances of each two adjacent areas is equal to or larger than a predetermined value. In a case where the difference between the object distances of two adjacent areas is smaller than the predetermined value (for example, 0), it is assumed that a three-dimensional object exists on the horizontal plane, and these areas are not detected as the area to which the tilted focal plane can be set.

FIG. 1 illustrates a case where the tilt-focal plane detecting unit 113 is provided outside the image pickup apparatus 100 (and is provided in, for example, a personal computer), but the tilt-focal plane detecting unit 113 may be provided inside the image pickup apparatus 100. Both the object detecting unit 112 and the tilt-focal plane detecting unit 113 may be provided inside the image pickup apparatus 100.

The tilt-focal plane detecting unit 113 may detect an area in which the user intends to set the tilted focal plane, according to an instruction from the user. That is, an area input by the user may be set as the tilted focal plane.

The in-focus degree acquiring unit 114 sets an evaluation area (evaluation frame) of which an in-focus degree is acquired, based on the position information among the target object information received from the object detecting unit 112. Then, for each set evaluation frame, the in-focus degree acquiring unit 114 calculates (acquires) the in-focus evaluation value indicating (or representing) a contrast of a specific frequency, that is, indicating the in-focus degree, by using an RGB pixel value or a luminance value in the digital image pickup signal received from the AD converter 108 or the video signal received from the camera signal processing unit 109.

The tilt-angle/focus-amount calculating unit 115 calculates a focusing amount as a driving amount of the focus lens 102 and a tilt angle as a tilt driving amount of the image sensor 106 for when the height of the tilted focal plane is changed. The focus correction amount calculating unit 116 calculates a focus correction amount that is a correction amount of the driving amount (or position) of the focus lens 102 for reducing upper/lower blur caused by a difference between a height of a position including the upper/lower blur and a height of the tilted focal plane.

The tilt controlling unit 117 transmits an instruction on a tilt set position to a tilt driving unit 120, according to the tilt angle calculated by the tilt-angle/focus-amount calculating unit 115 or according to a user instruction transmitted from the monitoring apparatus 111 via the communicating unit 110. The tilt driving unit 120 drives and tilts the image sensor 106 so as to rotate it to the tilt set position according to the instruction from the tilt controlling unit 117. Thereby, the tilted focal plane is moved so that its height changes.

The focus controlling unit 118 transmits an instruction on a focus set position to the focus driving unit 121, according to the focusing amount calculated by the tilt-angle/focus-amount calculating unit 115, according to the focus correction amount calculated by the focus correction amount calculating unit 116, or according to an instruction transmitted from the monitoring apparatus 111 via the communicating unit 110. The focus driving unit 121 drives the focus lens 102 to the focus set position according to the instruction transmitted by the focus controlling unit 118. In this way, the controlling unit 150 including the tilt-angle/focus-amount calculating unit 115, the focus correction amount calculating unit 116, the tilt controlling unit 117, and the focus controlling unit 118 performs tilt control via the tilt driving unit 120 and via the focus driving unit 121.

The zoom controlling unit 119 transmits an instruction on a zoom set position to a zoom driving unit 122 according to an instruction transmitted from the monitoring apparatus 111 via the communicating unit 110. The zoom driving unit 122 drives the zoom lens 101 to the zoom set position according to the instruction transmitted by the zoom controlling unit 119.

Figure 2:
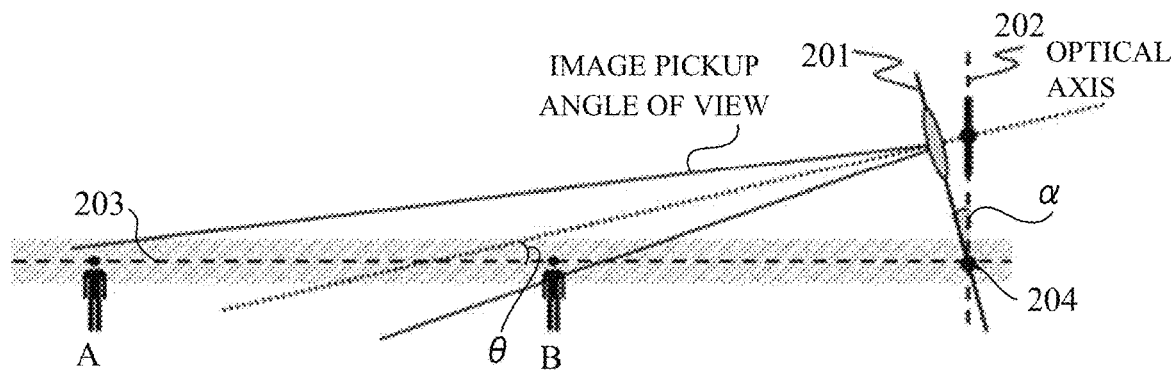
FIG. 2 is a diagram illustrating tilt control.

Next, a description is given of a gist of the tilt control with reference to FIG. 2. FIG. 2 illustrates an example in which the tilt control is performed such that a tilted focal plane is located at a height of people's faces as two target objects A and B at different distances from the image pickup apparatus 100. The tilt control is performed based on the Scheimpflug principle. The Scheimpflug principle is a description that when a lens principal plane 201 and an image pickup plane 202 intersect each other at a certain point (Scheimpflug point 204), a tilted focal plane 203 also intersects them at the point. A tilt angle α is calculated by the following equation (1) based on the Scheimpflug principle, where f represents a focal length of the image pickup optical system, L represents an object distance on the optical axis, and θ represents a depression angle that is an angle between the optical axis and the horizontal plane.

$$\alpha = \tan^{-1}\left(\frac{f}{L \times \tan\theta}\right) \quad (1)$$

Thus, it is possible to focus on target objects at a close distance to a far distance on the tilted focal plane 203.

Figure 3:
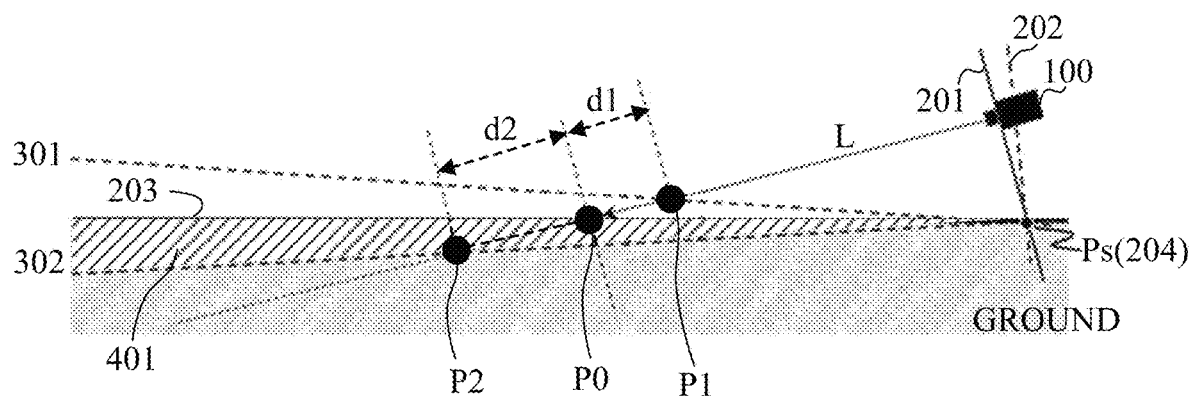
FIG. 3 is a diagram illustrating a tilt depth of field.

A description is given of a tilt depth of field with reference to FIG. 3. In a case where the tilt control is not performed (the lens principal plane and the image pickup plane are parallel), a normal depth of field includes a front depth of field d1, which is a range seemed to be in-focus and is located on a close side of an in-focus position P0, and a rear depth of field d2, which is a range seemed to be in-focus and is located on a far side of the in-focus position P0. The front depth of field d1 and the rear depth of field d2 is calculated by the following equations (2) and (3) where f represents a focal length, L represents an object distance on an optical axis, Fno represents an F-number, and δ represents permissible confusion circle diameter. The permissible confusion circle diameter δ corresponds to a pixel pitch of the image sensor 106.

$$d1 = \frac{\delta \times F_{no} \times L^2}{f^2 + \delta \times F_{no} \times L} \quad (2)$$

$$d2 = \frac{\delta \times F_{no} \times L^2}{f^2 - \delta \times F_{no} \times L} \quad (3)$$

On the other hand, as illustrated in FIG. 3, the tilt depth of field means an in-focus range from an upper depth end 301, which is an upper end of the tilt depth of field, to a lower depth end 302, which is a lower end of the tilt depth of field. When it is assumed that P1 is a point closer than an in-focus position P0, which is a reference, by the front field distance d1 on the optical axis, the upper depth end 301 is specified by a straight line passing through a Scheimpflug point Ps and the point P1. When it is assumed that P2 is a point farther than the in-focus position P0 by the rear field distance d2 on the optical axis, the lower depth end 302 is specified by a straight line passing through the Scheimpflug point Ps and the point P. As illustrated in FIG. 3, the shorter a distance from the image pickup apparatus 100, the narrower a width in a vertical direction of the in-focus range as the tilt depth of field, and upper/lower blur is likely to occur in optical images of upper and lower objects outside the in-focus range among target objects.

Now, a description focuses on the lower depth end 302, which is an end of tilt depth of field. In a case where the tilted focal plane 203 is set to a position corresponding to the ground (or may be set to a position matching the ground) as illustrated in FIG. 3, the in-focus range from the tilted focal plane 203 to the lower depth end 302 is located on a lower side of the ground. In the captured image, a target object located on the lower side of the ground is not imaged, and therefore the in-focus range from the tilted focal plane 203 to the lower depth end 302 is useless. As described above, in a case where the tilt depth of field includes an area 401 not including the target object imaged in the captured image (hereinafter, referred to as an invalid depth area), the height of the tilted focal plane 203 is changed so that the invalid depth area 401 is reduced (or may be eliminated). Thus, the upper/lower blur can be reduced by effectively using the tilt depth of field.

A description is given of control for changing the height of the tilted focal plane 203 with reference to FIGS. 4A and 4B. FIG. 4A illustrates a state before the control on the height of the tilted focal plane 203 for reducing the invalid depth area 401, and in this state, the tilted focal plane 203 is at the height of the ground (first target object) as in FIG. 3 and the lower depth end 302 is lower than the ground. Here, β represents an angle between the tilted focal plane 203 and the optical axis. In FIG. 4A, β is the same as the depression angle θ illustrated in FIG. 3.

FIG. 4B illustrates a state after the control on the height of the tilted focal plane 203 for reducing the invalid depth area 401. After the control, from the state illustrated in FIG. 4A, the tilted focal plane 203 is moved upward so that the lower depth end 302 is located at a position close to the ground (or may be located at a position matching the ground). In this state, an angle β' between the tilted focal plane 203 and the optical axis is larger than the angle β.

In order that the height of the tilted focal plane 203 is controlled as described above, the focus lens 102 is controlled to move to a near side or an infinite distance side (far side). For example, the tilted focal plane 203 is to be moved upward (the angle between the tilted focal plane 203 and the optical axis is increased) from the state before the control illustrated in FIG. 4A to the state illustrated in FIG. 4B. Thus, the focus lens 102 is moved to the near side so that the point P2 on the optical axis illustrated in FIG. 4A matches the point P0, which is the intersection of the optical axis and the tilted focal plane 203. Here, a relationship expressed by the following equations (4) and (5) is acquired where L represents an object distance on the optical axis before the control L' represents an object distance on the optical axis after the control, and d2' represents a rear depth of field after the control.

$$L = L' + d2' \quad (4)$$

$$d2' = \frac{\delta \times F_{no} \times L'^2}{f^2 - \delta \times F_{no} \times L'} \quad (5)$$

Solving the simultaneous equations (4) and (5) derives the following equation (6) for calculating the object distance L' to be focused on so that the lower depth end 302 is set to the height of the ground as illustrated in FIG. 4B. By moving the focus lens 102 to the position such that this object distance L' is focused on, the tilted focal plane 203 illustrated in FIG. 4B can be acquired.

$$L' = \frac{L \times f^2}{f^2 + \delta \times F_{no} \times L} \quad (6)$$

When the invalid depth area 401 is reduced and most of the tilt depth of field area is located on the upper side of the ground, it is possible to reduce the occurrence of upper/lower blur.

On the other hand, in a case where roost of the range from the tilted focal plane 203 to the upper depth end 301 is an invalid depth area, the focus lens 102 is moved to the far side so that the tilted focal plane 203 is moved downward (the angle between the tilted focal plane 203 and the optical axis is reduced). In this case, the object distance L' to be focused on can be calculated by the following equation (7). The invalid depth area can be reduced by moving the focus lens 102 to a position such that this object distance L' is focused on.

$$L' = \frac{L \times f^2}{f^2 - \delta \times F_{no} \times L} \quad (7)$$

By controlling the position of the focus lens 102 so that the height of the tilted focal plane 203 (the angle between the tilted focal plane 203 and the optical axis) is changed as described above, tilt imaging can be performed while upper/lower blur is reduced. That is, it is possible to acquire a captured image in which a wide range is focused on as compared with a captured image acquired by normal tilt imaging.

Hereinafter, a description is given of embodiments including specific control on the tilted focal plane.

First Embodiment

Figure 5:
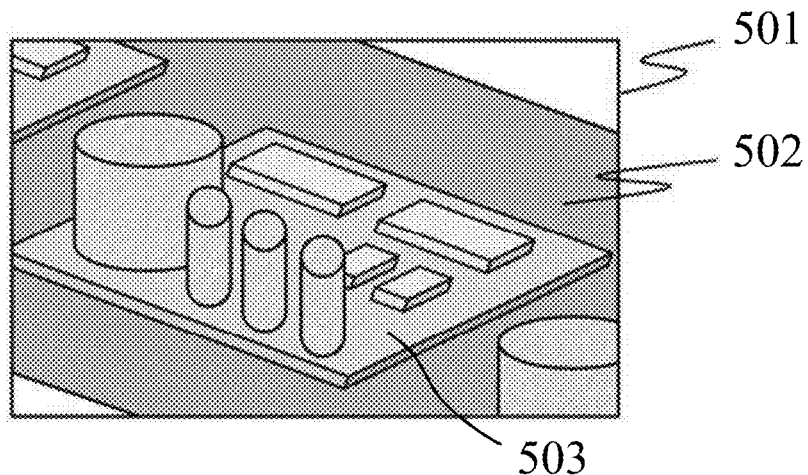
FIG. 5 is a diagram illustrating an example of a scene to be imaged according to the first embodiment.

The first embodiment detects a tilted focal plane included in a captured image, and changes a height of the detected tilted focal plane 20. FIG. 5 illustrates, as an example, a captured image 501 acquired in inspection of a substrate 503 on which various electronic components are mounted in a factory of electric product. Here, tilt imaging is performed at a close distance from the substrate 503 put on a horizontal inspection table 502 while a zooming state of the image pickup optical system is set to a telephoto state. In this tilt imaging, a depth of field of the image pickup optical system is shallow with respect to the substrate 503, and therefore upper/lower blur is likely to occur. Thus, the height of the tilted focal plane 203 may be controlled so that an invalid depth area is reduced and the occurrence of upper/lower blur is reduced.

Figure 6:
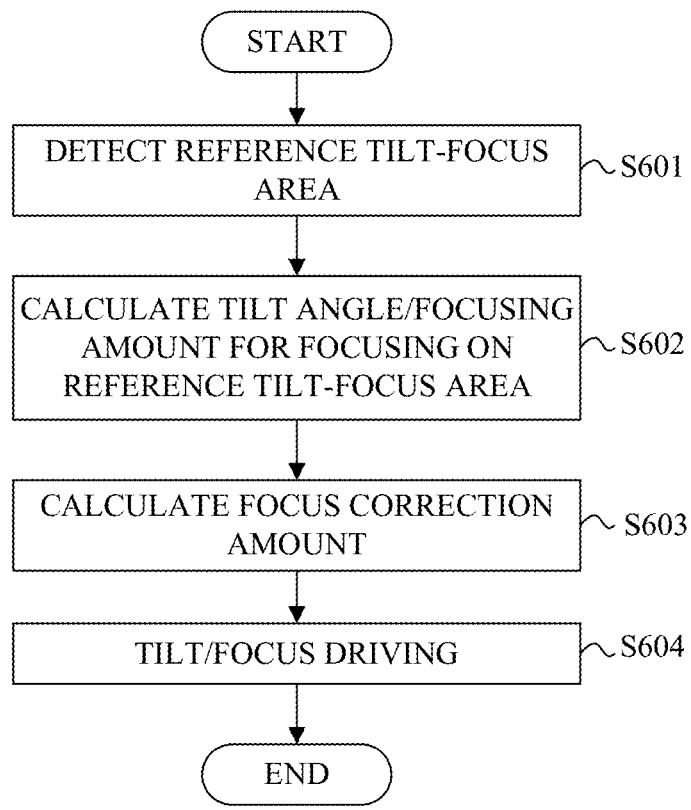
FIG. 6 is a flowchart illustrating processing to be executed by the image pickup apparatus according to the first embodiment.

A flowchart in FIG. 6 illustrates processing for controlling the tilted focal plane (controlling method) to be executed by a controlling unit 150. The controlling unit 150 is a computer and executes this processing according to a computer program. S in the drawing represents a step.

In step 601, the controlling unit 150 (tilt-focal plane detecting unit 113) detects an area to be a reference to which the tilted focal plane is set (hereinafter, referred to as a reference tilt-focus area). In the case of the captured image 501 illustrated in FIG. 5, the area of the horizontal inspection table (first target object) 502 on which the substrate 503 is placed is detected as the reference tilt-focus area.

Next, in step 602, the controlling unit 150 (tilt-angle/focus-amount calculating unit 115) calculates a tilt angle and a focusing amount such that the reference tilt-focus area detected in step 601 is focused on (that is, the tilted focal plane is set to a height (first position) corresponding to the height of the reference tilt-focus area).

At this time, the tilt-angle/focus-amount calculating unit 115 acquires information indicating (representing, including, containing, or relating to) an imaging condition (or imaging conditions) (an object distance on the optical axis from an image pickup plane to the object, a focal length, a depression angle, a height at which the image pickup apparatus 100 is placed, and the like) from position information on each lens, an external sensor, an instruction input by a user, or the like. Then, the tilt-angle/focus-amount calculating unit 115 calculates the tilt angle and the focusing amount by using the acquired information indicating the imaging condition.

The tilt angle may be set to a tilt angle at which the in-focus degree (in-focus evaluation value) acquired in the reference tilt-focus area by the in-focus degree acquiring unit 114 becomes maximum, the tilt angle being acquired by driving the focus lens 102 to a position at which the reference tilt-focus area is focused on and changing the tilt angle of the image sensor 106 by each predetermined amount.

Subsequently, in step 603, in order to reduce an invalid depth of field, the controlling unit 150 (focus correction amount calculating unit 116) calculates a focus correction amount for correcting the focusing amount calculated in step 602 to a focusing amount with which an actual tilted focal plane is moved to a position higher than a position of the reference tilt-focus area (a second position as a target position). As described above with reference to FIG. 4A, in the case where the invalid depth area 401 is located in the in-focus range from the tilted focal plane 203 to the lower depth end 302, the invalid depth area 401 can be reduced (or eliminated) by moving the focus lens 102 to the near side. The moving amount of the focus lens 102 at this time corresponds the focus correction amount, and the focus correction amount calculating unit 116 calculates the focus correction amount by using the equation (6) described above.

Subsequently in step 604, the controlling unit 150 (tilt controlling unit 117) drives and tilts the image sensor 106 via tilt driving unit 120 so as to make the tilt angle of the image sensor 106 become the tilt angle calculated in step 602. The controlling unit 150 (focus controlling unit 118) drives the focus lens 102 via the focus driving unit 121 by a corrected focusing amount that is acquired by correcting the focusing amount calculated in step 602 by using the focus correction amount calculated in step 603.

As described above, in this embodiment, the position of the focus lens 102 when the tilted focal plane 203 is to be set to a first position corresponding to a position of a first target object (inspection table 502) is corrected to a position of the focus lens 102 at which the tilted focal plane 203 is set to the second position that is different from the first position and at which the position of the first target object is included in the depth of field.

Figure 7B:
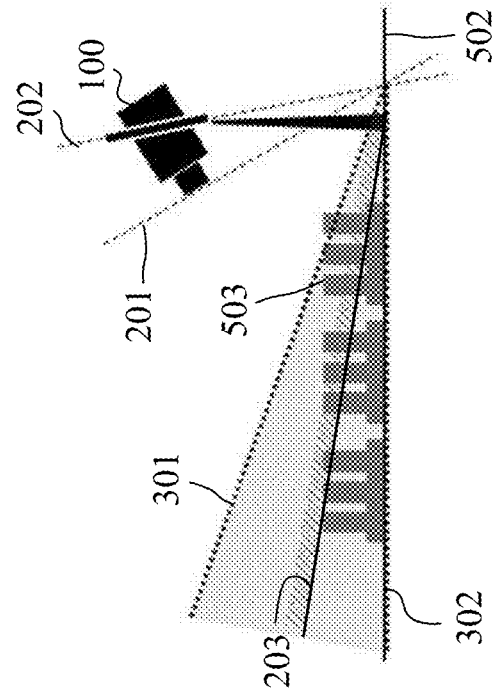
FIGS. 7A and 7B are diagrams illustrating states before and after control on a tilted focal plane according to the first embodiment.
Figure 7A:
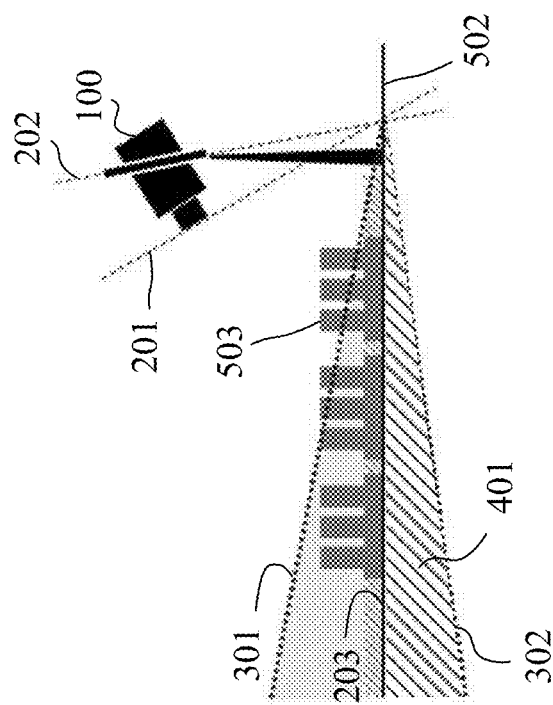

FIG. 7A illustrates the tilted focal plane 203 in a case where the image sensor 106 (image pickup plane 202) is driven and tilted by the tilt angle calculated in step 602 relatively to the lens principal plane 201 and the focus lens 102 is driven by the focusing amount calculated in step 602. The tilted focal plane 203 is set to a height corresponding to the height of the inspection table 502, and the in-focus range from the tilted focal plane 203 to the lower depth end 302 is an invalid depth area 401 on the lower side of the inspection table 502. As a result, the actual in-focus range is a narrow range from the tilted focal plane 203 to the upper depth end 301, upper parts of the electronic components close to the image pickup apparatus 100 is outside the tilt depth of field, and upper blur occurs in the upper parts.

On the other hand, FIG. 7B illustrates the tilted focal plane 203 in a case where the image sensor 106 is driven and tilted by the tilt angle calculated in step 602, and the focus lens 102 is driven by the corrected focusing amount acquired in step 604. The tilted focal plane 203 is located at a position higher than the inspection table 502 so that the lower depth end 302 is located at a position close to the height of the inspection table 502 (or may be located at a position corresponding to or matching the height of the inspection table 502). Thereby, there is almost no invalid depth area 401. As a result, almost all of the upper parts of the electronic components close to the image pickup apparatus 100 is located inside the tilt depth of field, and it is possible to acquire a captured image including less upper blur than a captured image in the case of FIG. 7A.

As described above, this embodiment provides the control such that the tilted focal plane is set to the second position at which the invalid depth area is smaller than that at the first position, and thereby can effectively use the tilt depth of field and reduce the occurrence of upper/lower blur.

In this embodiment, a description is given of the case where the tilted focal plane is set to the second position without a step of actually setting the tilted focal plane to the first position (with a step of calculating the position of the focus lens such that the tilted focal plane is set the first position). However, the tilted focal plane may be set to the second position after the tilted focal plane is set to the first position.

Second Embodiment

In the second embodiment, by using a detection result of a target object in a scene to be imaged is used to perform dynamic control such that a tilted focal plane suitable for the scene is acquired. A configuration of an image pickup apparatus according to this embodiment is same as the image pickup apparatus 100 according to the first embodiment (FIG. 1) except that the image pickup apparatus according to this embodiment includes a determining unit described below.

FIGS. 9A and 9B respectively illustrate examples of scenes 901 and 902 in each of which the dynamic control is to be performed on the tilted focal plane. In the scene 901, many adults and children as target objects are walking on a sidewalk, and a tilted focal plane 903 is set such that adults' faces (first target object) surrounded by solid line frames are focused on. In this case, children's faces (second target object) surrounded by dotted frames at positions lower than the positions of the adults' faces are not focused on, and therefore lower blur occurs.

The scene 902 is a scene to be imaged by an image pickup apparatus installed at a platform of a train station, and a tilted focal plane 904 is set such that faces of people on the platform (first target object) surrounded by solid frames are focused on. In this case, in an unusual situation when a person (people) enters a railroad track at a position lower than the platform, a face of the person on the railroad track (second target object) surrounded by a dotted frame is not focused on, and therefore lower blur occurs.

In this embodiment, upper/lower blur including the lower blur described above is reduced by setting a height of the tilted focal plane properly for these scenes. The target object may be an object (or objects) other than a person and a person's face and may be a vehicle, its license plate, or the like.

Figure 8:
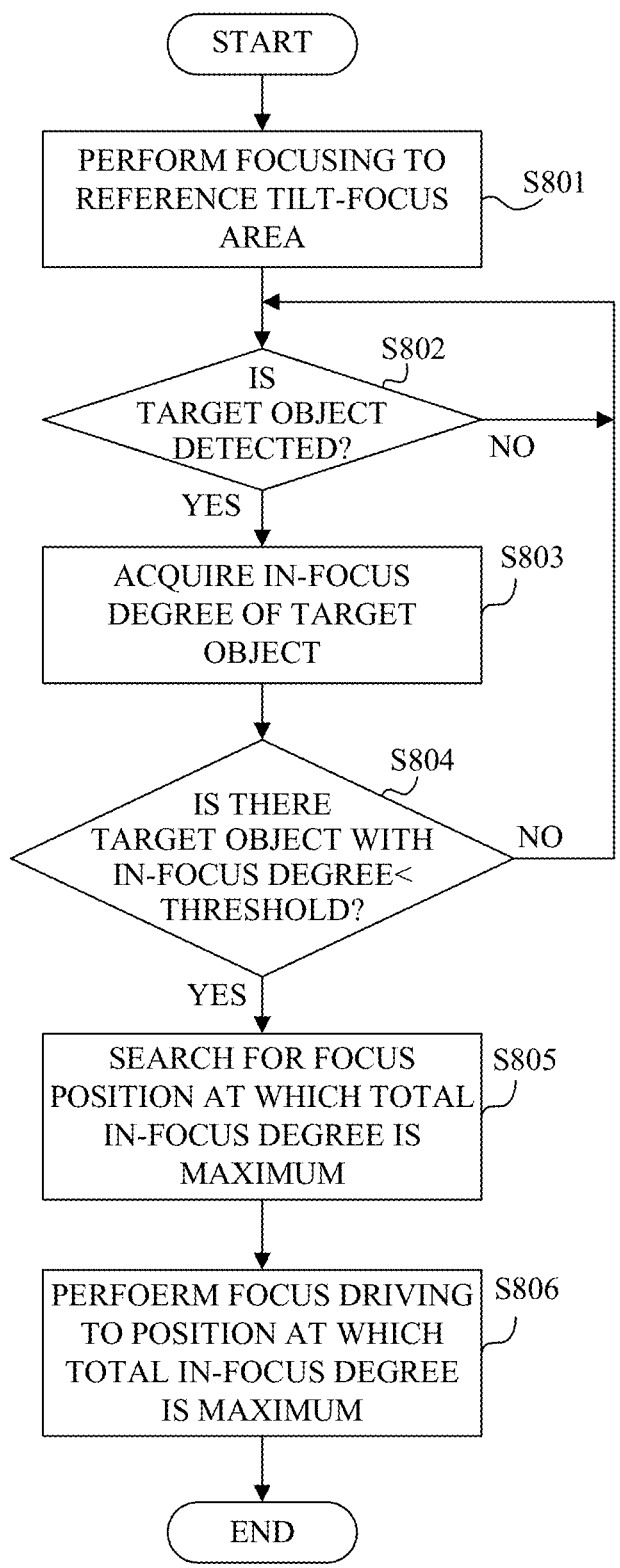
FIG. 8 is a flowchart illustrating processing to be executed by the image pickup apparatus according to the second embodiment.

The flowchart of FIG. 8 illustrates processing for controlling the tilted focal plane (controlling method) to be executed by the controlling unit 150. The controlling unit 150, which is a computer, executes the processing according to a computer program. In this embodiment, as indicated with parentheses in FIG. 1, the controlling unit 150 includes a determining unit 130 inside.

In step 801, the controlling unit 150 (a tilt controlling unit 117 and a focus controlling unit 118) controls tilt driving of an image sensor 106 and driving of a focus lens 102 so as to place the tilted focal plane at a height as a reference corresponding to a height of a first target object included in a captured image (first position). The height of the first target object may be input and designated by a user via a monitoring apparatus 111 or may be a height including a plurality of first target objects set based on a detection result of an object detecting unit 112 that has detected a target object (person on a sidewalk or on a platform).

As described in the first embodiment, the tilt angle of the image sensor 106 and the focusing amount, which is the moving amount of the focus lens 102, for setting the tilted focal plane to the height corresponding to the height of the first target object can be set based on an imaging condition. Alternatively, the tilt angle and the focusing amount may be calculated based on an image height and a defocus amount of the first target object, or may be acquired by searching for a tilt angle and a focusing amount such that in-focus degrees of the plurality of first target object become maximum.

If the tilted focal planes 903 and 904 are set in the scenes 901 and 902 illustrated in FIGS. 9A and 9B, respectively, captured images are acquired in each of which the people's faces surrounded by the solid frames from the close side to the far side are focused on.

Subsequently, in step 802, the controlling unit 150 (determining unit 130) determines whether or not the object detecting unit 112 detects a target object in a current frame in the captured image. In each of the scenes 901 and 902 in FIGS. 9A and 9B, a target object is a person's face. If the controlling unit 150 determines that the person's face is detected in the current frame, the process proceeds to step 803, and if the controlling unit 150 does not determine that the person's face is not detected in the current frame, the controlling unit 150 repeats the determination on whether or not the target object is detected in the next frame.

In step 803, the controlling unit 150 (determining unit 130) acquires an in-focus degree (in-focus evaluation value) of the target object detected in the captured image from the in-focus degree acquiring unit 114. In a case where a plurality of target objects are detected, the in-focus degree is acquired for each target object.

Subsequently, in step S804, the controlling unit 150 (determining unit 130) compares the in-focus degree of the target object acquired in step 803 with a threshold that is a predetermined value, and determines whether or not there is a target object whose in-focus degree is lower than the threshold. If there is a target object whose in-focus degree is lower than the threshold, the captured image includes a blurred target object, indicating that the tilted focal plane set in step 801 is not such that a proper tilt depth of field is acquired. For example, in the scenes 901 and 902 in FIGS. 9A and 9B, the faces surrounded by the dotted frames are the target objects whose in-focus degrees are determined to be lower than the threshold. Since the heights (position in a direction in which the position of the tilted focal plane 203 is set) of these target objects surrounded by the dotted frames are lower than the height of the tilted focal plane 903 or 904, lower blur occurs in these target objects. If there is a target object whose in-focus degree is lower than the threshold, the process proceeds to step 805, and if there is no such a target object, the process returns to step 802.

In step 805, the controlling unit 150 (determining unit 130) adds up respective in-focus degrees of the target objects acquired in step 803 so as to calculate a total value of the in-focus degrees (hereinafter, referred to as total in-focus degree). Thereafter, the controlling unit 150 performs focus search that searches for a position of the focus lens 102 at which the total in-focus degree becomes maximum (hereinafter, referred to as peak focus position) while moving the focus lens 102 via the focus controlling unit 118 and the focus driving unit 121 by each predetermined amount from the position to which the focus lens 102 is driven in step 801. At this time, by estimating the height of the target object whose in-focus degree is determined to be lower than the threshold in step 804, a driving direction of the focus lens 102 during the focus search can be determined based on a relation between heights of the target object and the tilted focal plane.

FIGS. 10A and 10B illustrate a determination method of the driving direction of the focus lens 102 during the focus search. In FIGS. 10A and 10B, A and C (first target object) among three target objects (faces) A, B, and C are located at positions of the height of tilted focal plane 203, and B (second target object) is located at a position higher or lower than the height of the tilted focal plane 203 and is outside the tilt depth of field. In these cases, it is determined that the in-focus degree of the target object B is lower than the threshold. At this time, if the focus lens 102 is driven to the far side, the tilted focal plane 203 moves downward, and if the focus lens 102 is driven to the near side, the tilted focal plane 203 moves upward. In FIG. 10A, if the tilted focal plane 203 is moved properly upward, all of the target objects A, B, and C are included in the tilt depth of field. In FIG. 10B, if the tilted focal plane 203 is moved properly downward, all of the target objects A, B, and C are included in the tilt depth of field.

By using these relations, the focus search can be performed without unnecessary driving of the focus lens 102, and the tilted focal plane 203 can be quickly controlled to a height that provides a proper tilt depth of field.

A driving range of the focus lens 102 during the focus search may be set within a range whose both ends are a position of the focus lens 102 where the upper depth end 301 of the moving tilted focal plane 203 is located at a position corresponding to the tilted focal plane before the movement and a position of the focus lens 102 where the lower depth end 302 of the moving tilted focal plane 203 is located at a position corresponding to the tilted focal plane before the movement. In other words, the driving range of the focus lens 102 may be limited so that the tilted focal plane 203 moves within a range of a depth of field whose ends are located at positions where the tilted focal plane 203 is at the heights corresponding to the heights of the target objects A and B. In this case, it is possible to perform the focus search that does not include unnecessary driving of the focus lens 102.

Next, in step 806, the controlling unit 150 (focus controlling unit 118) drives the focus lens 102 to the peak focus position searched in step 805 via the focus driving unit 121.

As described above, in this embodiment, the tilted focal plane 203 is set to the first position corresponding to the position of the first target object (people on the platform), and then in-focus degrees of the first and second target objects are acquired. Thereafter, based on the acquired in-focus degrees, the position of the focus lens 102 is controlled so that the tilted focal plane 203 is set to the second position as the target position at which the positions of the first target object and the second target object (person on the railroad track) are both included in the depth of field.

Figure 11B:
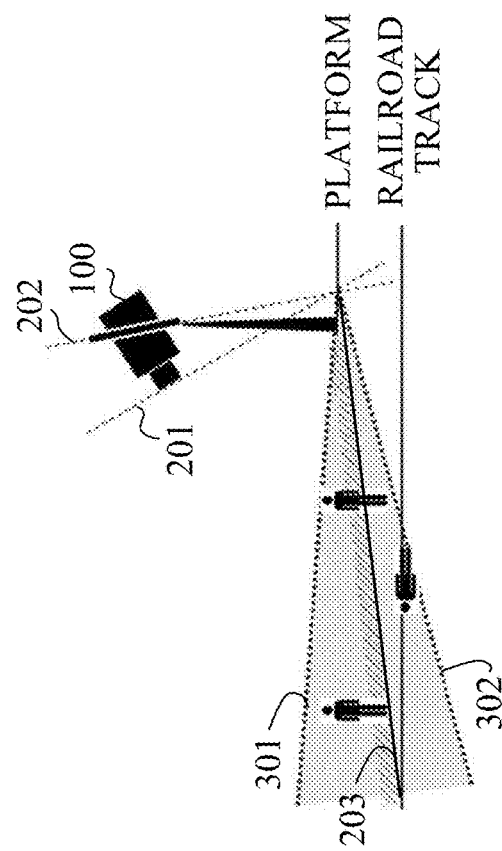
FIGS. 11A and 11B are diagrams illustrating states before and after control on a tilted focal plane according to the second embodiment.
Figure 11A:
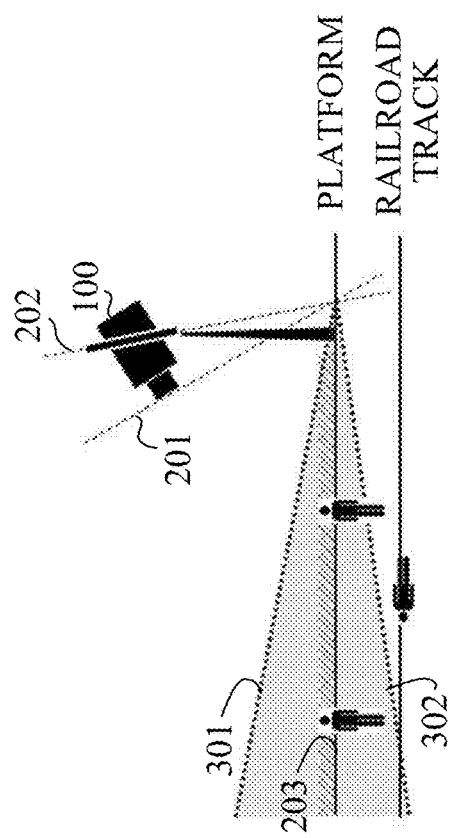

FIG. 11A illustrates the relation in the scene of in FIG. 9B between the tilted focal plane 203 controlled in step 801, the tilt depth of field (upper and lower depth ends 302 and 303), and the target objects (people on the platform and a person on the railroad track). At this time, a focused captured image is obtained for people on the platform inside the tilt depth of field, but only a blurred captured image is obtained for the person on the railroad track outside the tilt depth of field.

FIG. 11B illustrates the relation in the scene of FIG. 9B between the tilted focal plane 203, the tilt depth of field, and the target objects, after the focus lens 102 is controlled to the peak focus position in step 805. In this drawing, the height of the tilted focal plane 203 is set so that the upper depth end 301, which is one end of the depth of field, is close to the height of the person's face on the platform as compared to the case where the tilted focal plane 203 is at the height corresponding to the height of the people's faces (first target object) on the platform as illustrated in FIG. 11A. This allows both of people on the platform and the person on the railroad track to be included in the tilt depth of field (upper and lower depth ends 302 and 303), and provides a captured image in which all of these people are in focus.

As described above, since this embodiment controls the height of the tilted focal plane to be dynamically set according to the result of detecting the target object, it is possible to reduce the occurrence of upper/lower blur on those target objects even in a case where the height of the target object changes.

Tilt imaging of the inspection table (first target object) 502 and substrate (second target object) 503 described in the first embodiment may use the control on the position of the tilted focal plane using the in-focus degrees as in this embodiment such that both the first and second target objects are included in the depth of field. In this case, the position of the lower depth end may be brought to a position close to or corresponding to the inspection table 502 by setting the tilted focal plane so that the total value of the respective in-focus degrees of the inspection table 502 and the substrate 503 becomes maximum.

Figure 12:
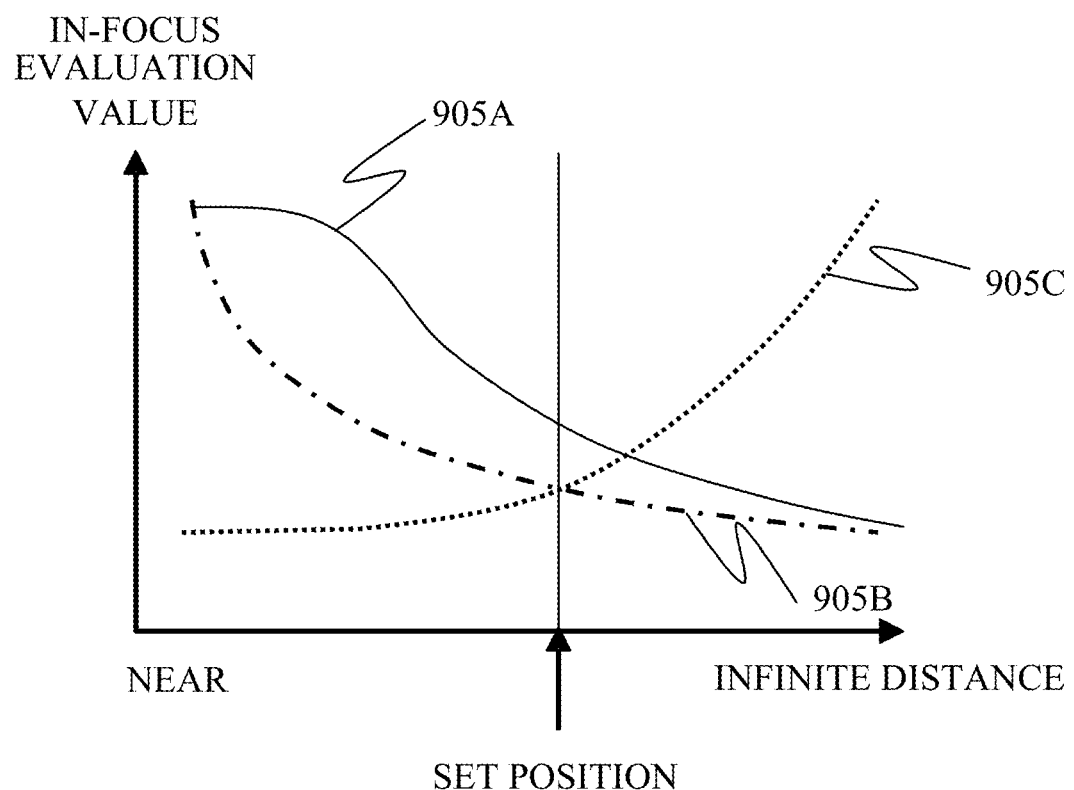
FIG. 12 is a diagram illustrating changes in in-focus evaluation values of focus positions according to the second embodiment

In a case where there are a plurality of target objects as illustrated in FIG. 9B, in order that all the target objects are easily recognized, the focal plane may be set to a position where a minimum value of the respective in-focus evaluation values of these target objects becomes maximum. FIG. 12 illustrates respective in-focus evaluation values 905A, 905B, and 905C of the target object on the far side of the platform, the target object on the close side of the platform, and the target object on the railroad track, in FIG. 9B when the focus lens is located at each position. As illustrated in FIG. 12, all target objects can be easily recognized by setting the position of the focal plane so that the minimum values of the in-focus evaluation values 905A, 905B, and 905C of these three target objects are maximized.

As in the case where there is a target object on the railroad track instead of on the platform as illustrated in FIG. 9B, if a target object is detected in a detection area that is different from a normal detection area, that is, in an area that does not normally include a target object, it is regarded that an abnormal situation has occurred. The focus lens or the tilt angle may be controlled so that the in-focus evaluation value 905C of the target object is increased.

Figure 13A:
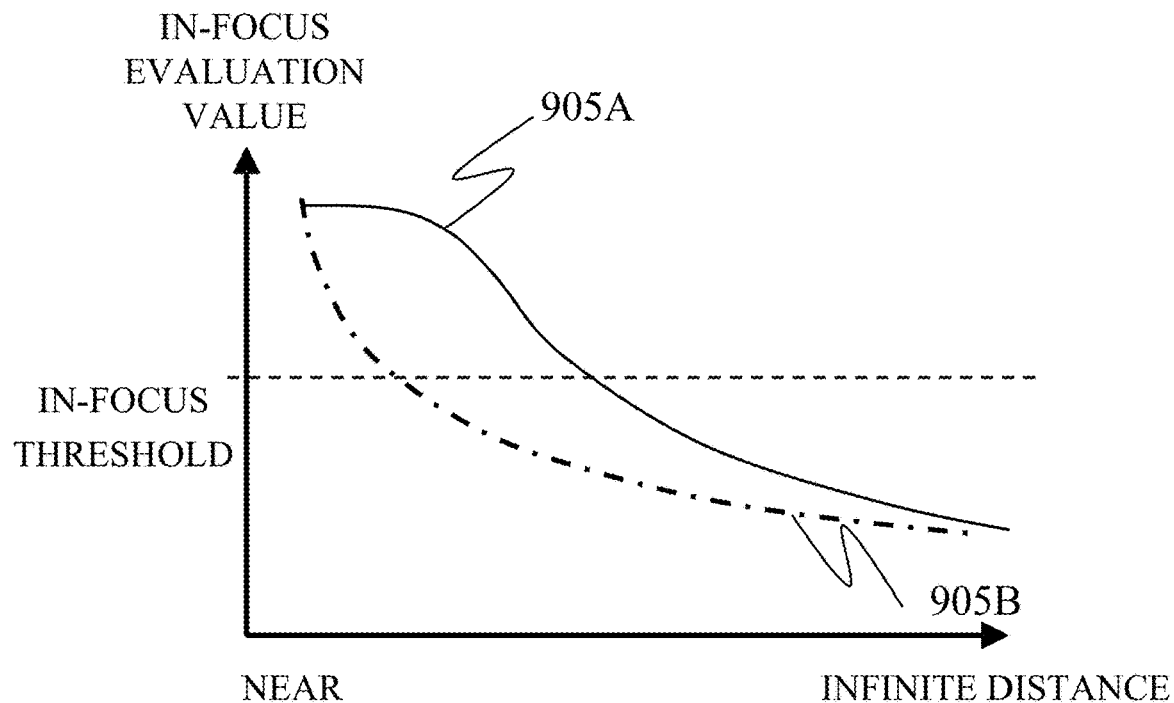
FIGS. 13A and 13B are diagrams illustrating changes in in-focus evaluation values caused by narrowing an aperture of a diaphragm according to the second embodiment.
Figure 13B:
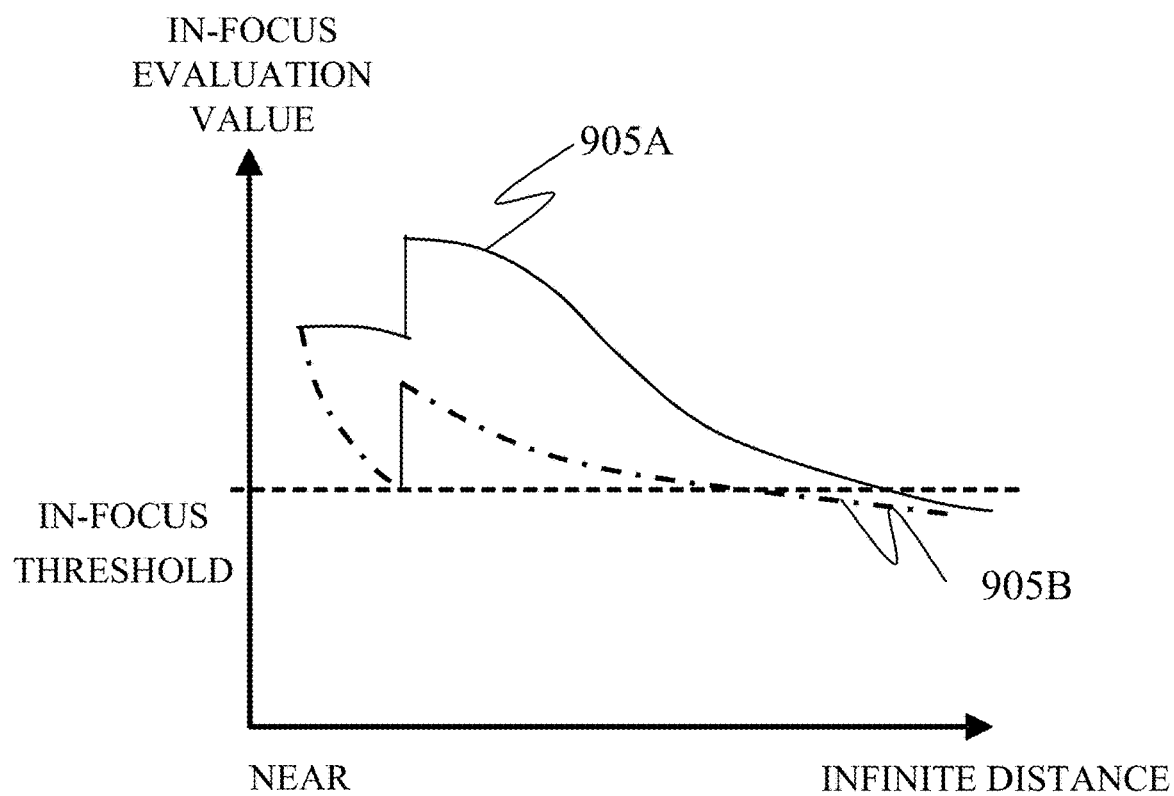

A description is further given of a controlling method for when the in-focus evaluation value is changed by a change in the position of the focus lens. FIG. 13A illustrates the in-focus evaluation values 905A and 905B of the target object on the far side and the target object on the close side of the platform illustrated in FIG. 9B. For example, when the focus lens moves from the near side to the infinite distance (far) side, the in-focus evaluation value 905B of the target object on the close side may become smaller than a threshold of the in-focus degree (in-focus threshold) and the target object on the close side may be blurred. In this case, narrowing an aperture of the diaphragm unit 103 can increase the in-focus evaluation value 905B of the target object on the close side to a value larger than the in-focus threshold as illustrated in FIG. 13B, and thereby the target object on the close side can be focused on. The in-focus evaluation value 905A for the target object on the far side can be similarly increased.

Figure 14:
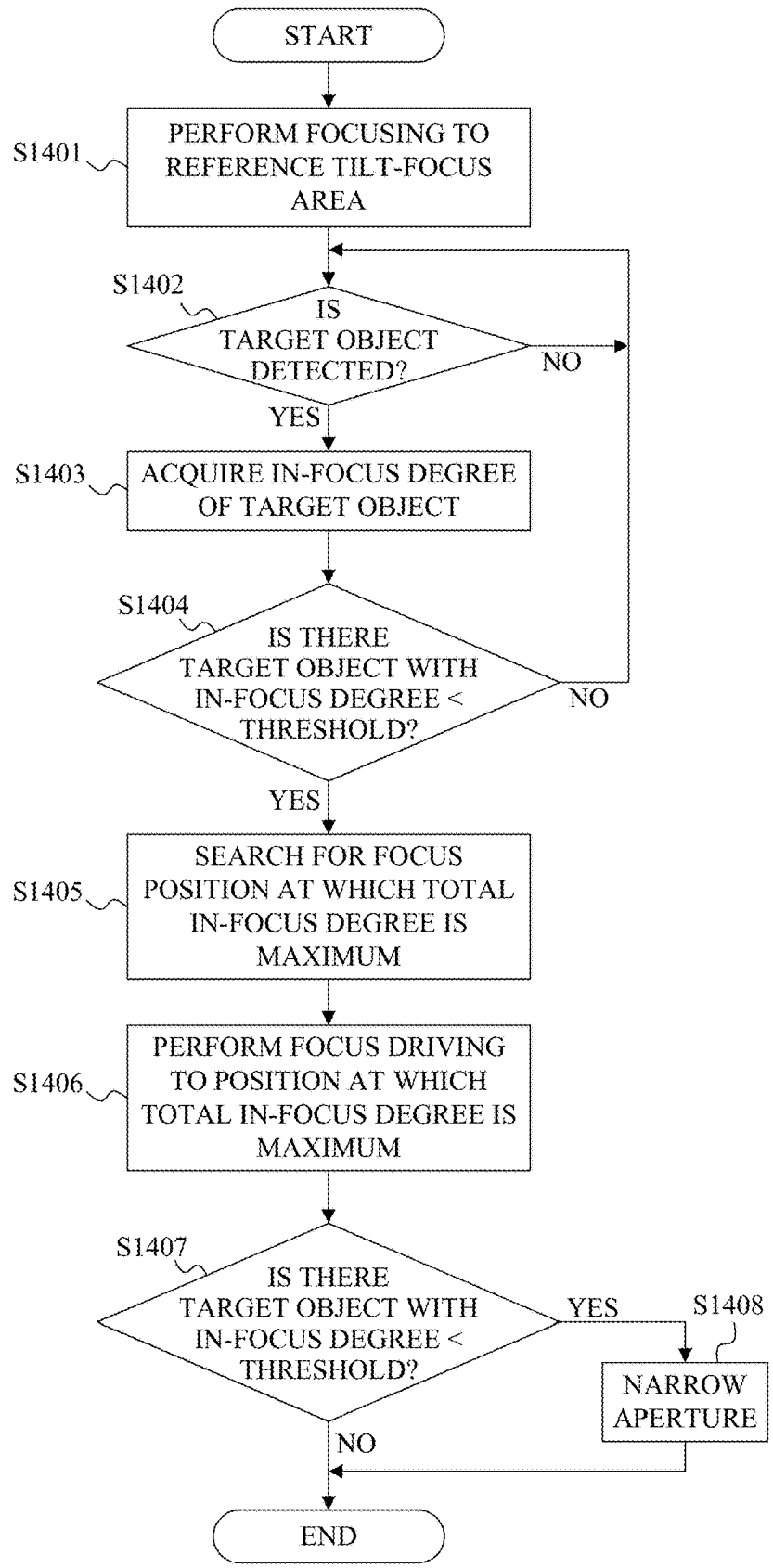
FIG. 14 is a flowchart taking aperture control into account according to the second embodiment.

The flowchart of FIG. 14 illustrates processing for controlling the tilted focal plane (controlling method), which is a modification to the processing illustrated in FIG. 8, to be executed b the controlling unit 150. The controlling unit 150 that executes this processing also includes the determining unit 130, as indicated in parentheses in FIG. 1. Steps 1401 to 1406 in FIG. 14 are the same as steps 801 to 806 in FIG. 8.

In step 1406, the controlling unit 150 drives the focus lens 102 to the peak focus position searched for in step 1405, and the process proceeds to step 1407. In step 1407, the controlling unit 150 (determining unit 130) determines whether or not there is a target object whose in-focus degree is lower than the threshold, as in step 1404. If there is a target object whose in-focus degree is lower than the threshold, the process proceeds to step 1408, and if there is no such target object, this processing ends.

In step 1408, the controlling unit 150 adjusts the diaphragm unit 103 based on an imaging condition (object distance, focal length, etc.). Thereafter, this processing ends.

Figure 15:
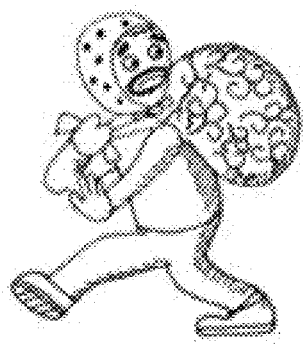
FIG. 15 illustrates an example of an object with high and low in-focus evaluation values according to the second embodiment.
Figure 15:
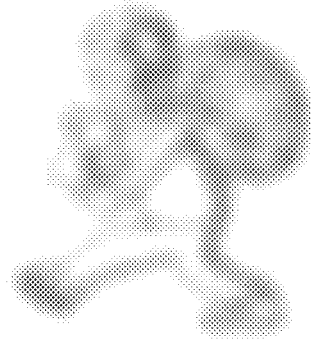

In this embodiment, the detection of the target object and an authentication technology, such as face authentication, may be combined. Some authentication technologies authenticate the target object as a specific target object in a case where an authentication evaluation value is equal to or higher than a predetermined authentication threshold. In this case, as illustrated in FIG. 15, it is difficult to authenticate a target object having a low in-focus evaluation value. Therefore, the controlling unit 150 may change (lower) the authentication threshold according to the in-focus evaluation value (in-focus degree), so as to increase an authentication rate that a target object having a low in-focus evaluation value is authenticated as a specific target object.

In each of the above embodiments, a description is given of the case where the image sensor (image pickup plane) is driven and tilted relatively to the fixed lens principal plane (that is, the image pickup optical system), but the image pickup optical system may be driven and tilted relatively to a fixed image pickup plane, or both of them may be driven and tilted. That is, at least one of the image pickup plane and the image pickup optical system may be driven and tilted. In a case where the image pickup optical system is driven and tilted, if the image pickup optical system is an interchangeable type, the tilt driving may be controlled by the image pickup apparatus (controlling unit).

In each of the above embodiments, a description is given of the case where the height of the tilted focal plane tilted relatively to the vertical direction is properly set, but a position in a horizontal direction of the tilted focal plane tilted relatively to the horizontal direction may be set by control similar to each embodiment.

The above-described embodiments include the following configurations.

Configuration 1

An image pickup apparatus comprising:

an image sensor configured to capture an optical image formed by an image pickup optical system;

at least one processor; and at least one memory coupled to the at least one processor storing instructions that, when executed by the at least one processor, cause the at least one processor to function as:

a controlling unit configured to, in tilt imaging that changes a tilt angle between an image pickup plane of the image sensor and a plane orthogonal to an optical axis of the image pickup optical system, set a focal plane to any position such that an angle between the focal plane and the optical axis is changed, by controlling at least one of (i) a position of a focus lens included in the image pickup optical system and (ii) the tilt angle, wherein the controlling unit controls the at least one so as not to set the focal plane to a first position corresponding to a position of a first target object that is an imaging target, but to set the focal plane to a second position that is different from the first position and at which the position of the first target object is included in a depth of field.

Configuration 2

The image pickup apparatus according to the configuration 1, wherein, in order to set the focal plane to the second position, the controlling unit corrects the at least one with which the focal plane is to be set to the first position.

Configuration 3

The image pickup apparatus according to the configuration 1, wherein the controlling unit controls the position of the focus lens and the tilt angle so as to set the focal plane to the first position, and then controls the at least one so as to set the focal planes to the second position.

Configuration 4

The image pickup apparatus according to any one of the configurations 1 to 3, wherein the second position is a position of the focal plane at which (i) one end of the depth of field is closer to the position of the first target object than in a case where the focal plane is set to the first position or (ii) the one end of the depth of field is located at a position corresponding to the position of the first target object.

Configuration 5

The image pickup apparatus according to any one of the configurations 1 to 4, wherein the second position is a position of the focal plane at which the depth of field includes both the first target object and a second target object that is an imaging target located at a position different from the position of the first target object in a direction in which the position of the focal plane is set.

Configuration 6

The image pickup apparatus according to the configuration 5, wherein the controlling unit acquires an in-focus degree for each of the first target object and the second target object, and controls the at least one based on the in-focus degree.

Configuration 7

The image pickup apparatus according to the configuration 6, wherein the second position is a position of the focal plane at which a total value of the in-focus degree acquired for each of the first target object and the second target object becomes maximum.

Configuration 8

The image pickup apparatus according to the configuration 6, wherein the second position is a position of the focal plane at which a minimum value of an in-focus degree acquired for each of a plurality of target objects becomes maximum.

Configuration 9

The image pickup apparatus according to any one of the configurations 6 to 8, wherein in a case where the in-focus degree of the second target object is lower than a predetermined value in a state where the focal plane is set to the first position, the controlling unit controls the at least one so as to set the focal plane to the second position.

Configuration 10

The image pickup apparatus according to any one of the configurations 6 to 10, wherein the controlling unit acquires the in-focus degree while moving the focus lens by each predetermined amount, and wherein the controlling unit determines direction in which the focus lens is moved by each predetermined amount based on the position of the focal plane and the position of the second target object.

Configuration 11

The image pickup apparatus according to configuration 10, wherein the controlling unit moves the focus lens by each predetermined amount so that the focal plane moves within a range of the depth of field of a case where the focal plane is set to the first position.

Configuration 12

The image pickup apparatus according to any one of the configurations 1 to 11, wherein the controlling unit sets the first position based on the position of the first target object detected in a captured image generated by imaging.

Configuration 13

The image pickup apparatus according to any one of the configurations 1 to 12, wherein controlling unit sets the first position based on the position of the first target object input by a user.

Configuration 14

The image pickup apparatus according to any one of the configurations 6 to 13, wherein the controlling unit acquires the in-focus degree while moving the focus lens by each predetermined amount, wherein the controlling unit determines a direction in which the focus lens is moved by each predetermined amount based on the position of the focal plane and the position of the second target object, and wherein in a case where there is a target object whose in-focus degree is lower than a predetermined value, the controlling unit narrows an aperture of a diaphragm included in the image pickup optical system.

Configuration 15

The image pickup apparatus according to any one of the configurations 1 to 14, wherein the controlling unit acquires the in-focus degree while moving the focus lens by each predetermined amount, and wherein in a case where a target object is detected in a detection area different from a normal detection area, the controlling unit controls the at least one so that an in-focus degree of the target object increases.

Configuration 16

The image pickup apparatus according to any one of the configurations 1 to 15, wherein in a case where the position of the focal plane is to be set to a position at which an angle between the focal plane and the optical axis becomes larger, the controlling unit moves the focus lens to a close side, and wherein in a case where the position of the focal plane is to be set to a position at which the angle between the focal plane and the optical axis becomes smaller, the controlling unit moves the focus lens to an infinite distance side.

Configuration 1

The image pickup apparatus according to any one of e configurations 6 to 16, wherein the controlling unit authenticates, as a specific object, a target object whose evaluation value for authenticating an object as the specific target object is equal to or larger than an authentication threshold, and wherein the controlling unit changes the authentication threshold depending on the in-focus degree.

According to the above embodiment, it is possible to reduce blur that occurs at a position different from a focal plane in tilt imaging.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132724, filed on Aug. 17, 2021, and No. 2022-069042, filed on Apr. 19, 2022, each of which is hereby incorporated by reference herein in its entirety.

What is claimed is:

1. An image pickup apparatus comprising:
   an image sensor configured to capture an optical image formed by an image pickup optical system;
   at least one processor; and
   at least one memory coupled to the at least one processor storing instructions that, when executed by the at least one processor, cause the at least one processor to function as:
      a controlling unit configured to, in tilt imaging that changes a tilt angle between an image pickup plane of the image sensor and a plane orthogonal to an optical axis of the image pickup optical system, seta focal plane to any position such that an angle between the focal plane and the optical axis is changed, by controlling at least one of (i) a position of a focus lens included in the image pickup optical system and (ii) the tilt angle, wherein the controlling unit controls the at least one so as not to set the focal plane to a first position corresponding to a position of a first target object that is an imaging target, but to set the focal plane to a second position that is different from the first position and at which the position of the first target object is included in a depth of field.

2. The image pickup apparatus according to claim 1, wherein, in order to set the focal plane to the second position, the controlling unit corrects the at least one with which the focal plane is to be set to the first position.

3. The image pickup apparatus according to claim 1, wherein the controlling unit controls the position of the focus lens and the tilt angle so as to set the focal plane to the first position, and then controls the at least one so as to set the focal planes to the second position.

4. The image pickup apparatus according to claim 1, wherein the second position s a position of the focal plane at which (i) one end of the depth of field is closer to the position of the first target object than in a case where the focal plane is set to the first position or (ii) the one end of the depth of field is located at a position corresponding to the position of the first target object.

5. The image pickup apparatus according to claim 1, wherein the second position is a position of the focal plane at which the depth of field includes both the first target object and a second target object that is an imaging target located at a position different from the position of the first target object in a direction in which the position of the focal plane is set.

6. The image pickup apparatus according to claim 5, wherein the controlling unit acquires an in-focus degree for each of the first target object and the second target object, and controls the at least one based on the in-focus degree.

7. The image pickup apparatus according to claim 6, wherein the second position is a position of the focal plane at which a total value of the in-focus degree acquired for each of the first target object and the second target object becomes maximum.

8. The image pickup apparatus according to claim 6, wherein the second position is a position of the focal plane at which a minimum value of an in-focus degree acquired for each of a plurality of target objects becomes maximum.

9. The image pickup apparatus according to claim 6, wherein in a case where the in-focus degree of the second target object is lower than a predetermined value in a state where the focal plane is set to the first position, the controlling unit controls the at least one so as to set the focal plane to the second position.

10. The image pickup apparatus according to claim 6, wherein the controlling unit acquires the in-focus degree while moving the focus lens by each predetermined amount, and wherein the controlling unit determines a direction in which the focus lens is moved by each predetermined amount based on the position of the focal plane and the position of the second target object.

11. The image pickup apparatus according to claim 10, wherein the controlling unit moves the focus lens by each predetermined amount so that the focal plane moves within a range of the depth of field of a case where the focal plane is set to the first position.

12. The image pickup apparatus according to claim 6, wherein the controlling unit acquires the in-focus degree while moving the focus lens by each predetermined amount, wherein the controlling unit determines a direction in which the focus lens is moved by each predetermined amount based on the position of the focal plane and the position of the second target object, and wherein in a case where there is a target object whose in-focus degree is lower than a predetermined value, the controlling unit narrows an aperture of a diaphragm included in the image pickup optical system.

13. The image pickup apparatus according to claim 6, wherein the controlling unit authenticates, as a specific object, a target object whose evaluation value for authenticating an object as the specific target object is equal to or larger than an authentication threshold, and wherein the controlling unit changes the authentication threshold depending on the in-focus degree.

14. The image pickup apparatus according to claim 1, wherein the controlling unit sets the first position based on the position of the first target object detected in a captured image generated by imaging.

15. The image pickup apparatus according to claim 1, wherein the controlling unit sets the first position based on the position of the first target object input by a user.

16. The image pickup apparatus according to claim 1, wherein the controlling unit acquires the in-focus degree while moving the focus lens by each predetermined amount, and wherein in a case where a target object is detected in a detection area different from a normal detection area, the controlling unit controls the at least one so that an in-focus degree of the target object increases.

17. The image pickup apparatus according to claim 1, wherein in a case where the position of the focal plane is to be set to a position at which an angle between the focal plane and the optical axis becomes larger, the controlling unit moves the focus lens to a close side, and wherein in a case where the position of the focal plane is to be set to a position at which the angle between the focal plane and the optical axis becomes smaller, the controlling unit moves the focus lens to an infinite distance side.

18. A controlling method of an image pickup apparatus including an image sensor configured to capture an optical image formed by an image pickup optical system, the controlling method comprising setting, in tilt imaging that changes a tilt angle between an image pickup plane of the image sensor and a plane orthogonal to an optical axis of the image pickup optical system, a focal plane to any position such that an angle between the focal plane and the optical axis is changed, by controlling at least one of (i) a position of a focus lens included in the image pickup optical system and (ii) the tilt angle, wherein the setting controls the at least one so as not to set the focal plane to a first position corresponding to a position of a first target object that is an imaging target, but to set the focal plane to a second position that is different from the first position and at which the position of the first target object is included in a depth of field.

19. A non-transitory computer-readable storage medium storing a computer program that causes a computer of an image pickup apparatus including an image sensor configured to capture an optical image formed by an image pickup optical system to execute a controlling method according to claim 18.

* * * * *